Figure 1:
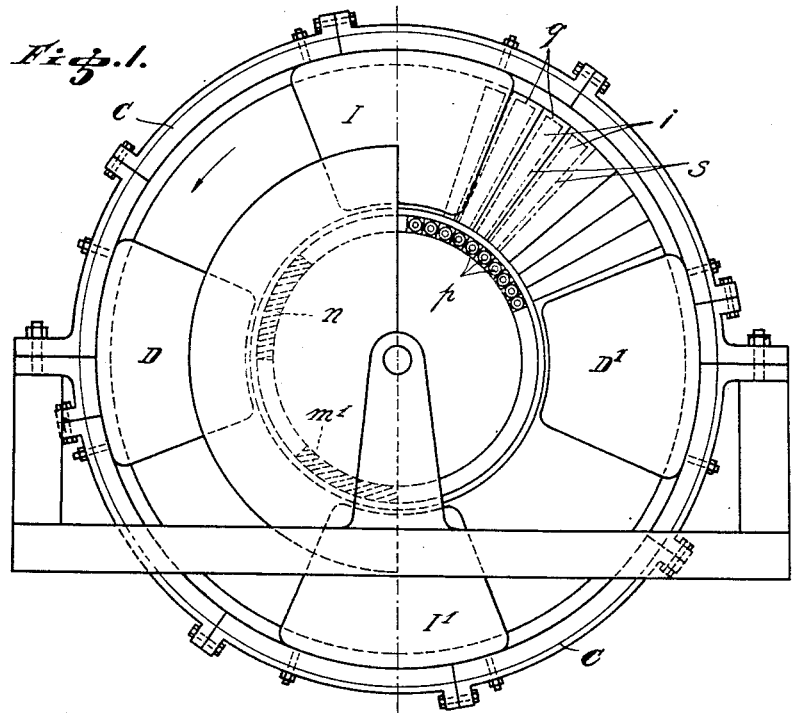

July 30, 1935.    G. LANDWERLIN    2,009,503
ELECTROSTATIC MACHINE
Filed April 13, 1933    5 Sheets-Sheet 1

Inventor
Georges Landwerlin
per J. Gevers
Attorney

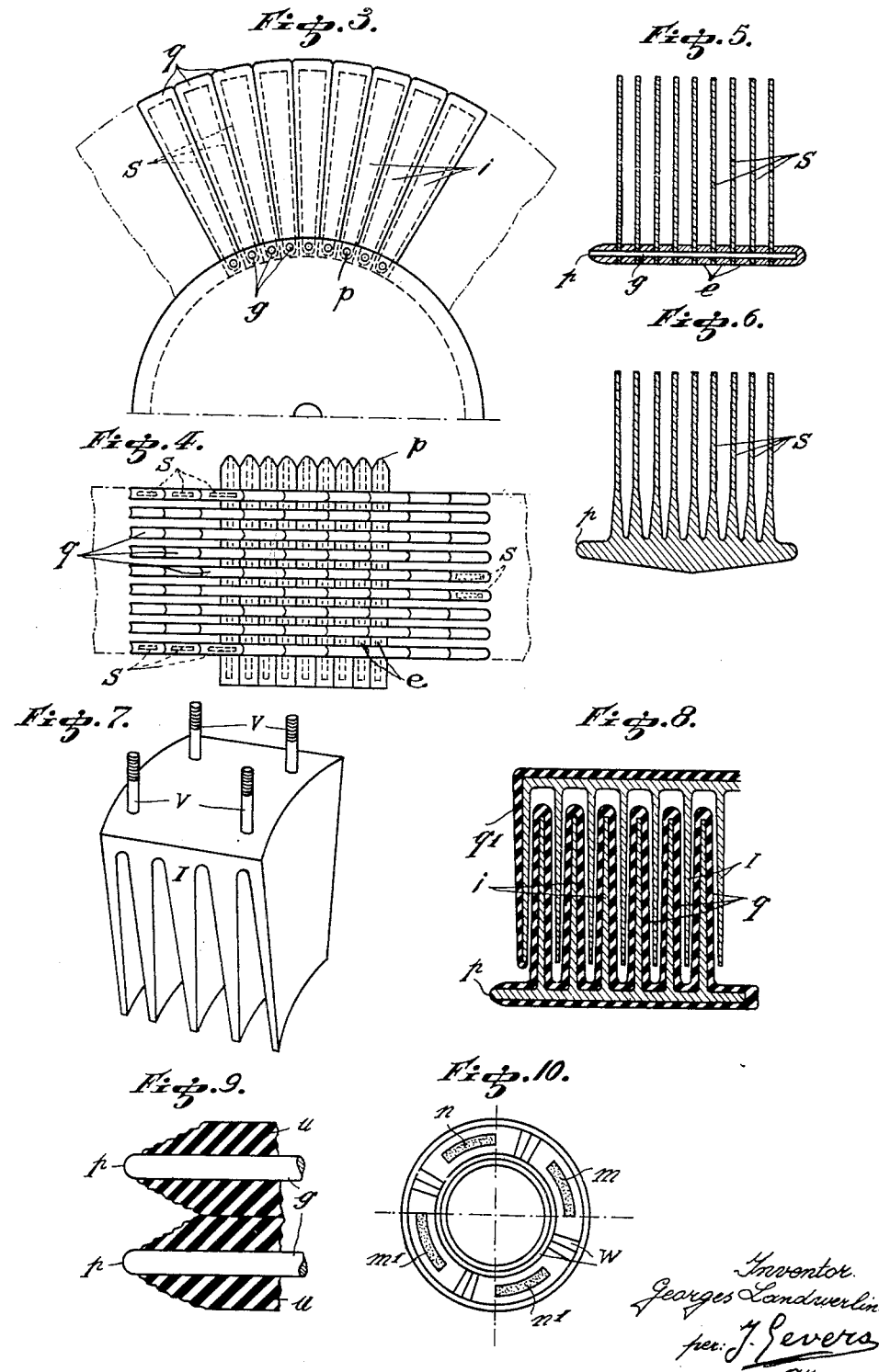

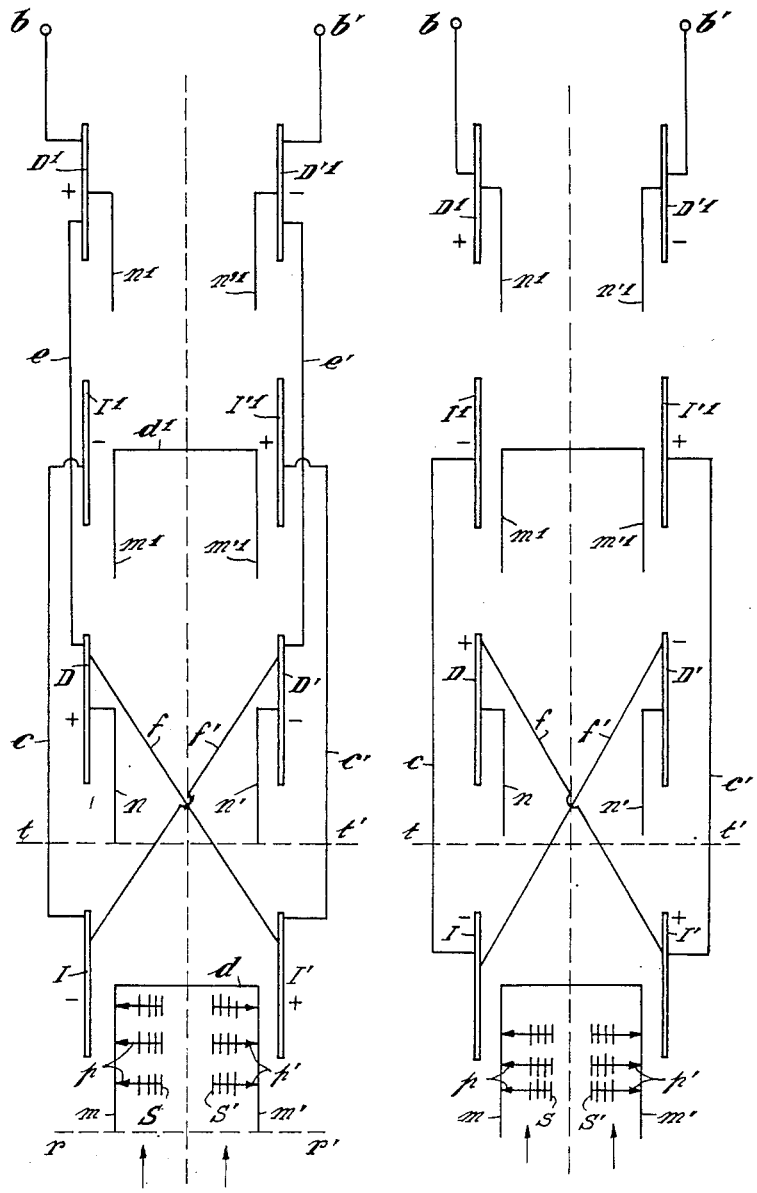

July 30, 1935.   G. LANDWERLIN   2,009,503
ELECTROSTATIC MACHINE
Filed April 13, 1933   5 Sheets-Sheet 4
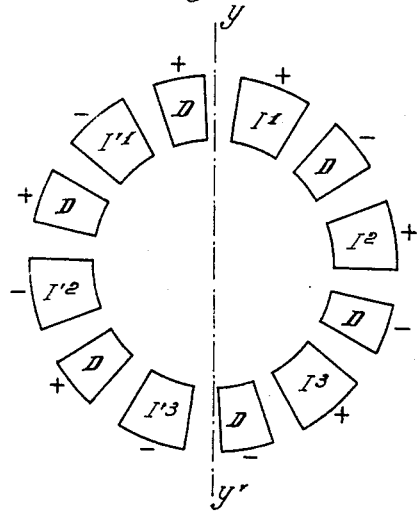
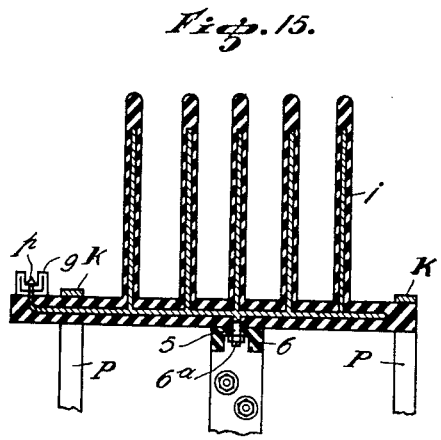
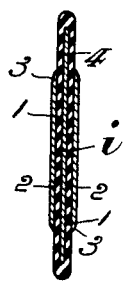
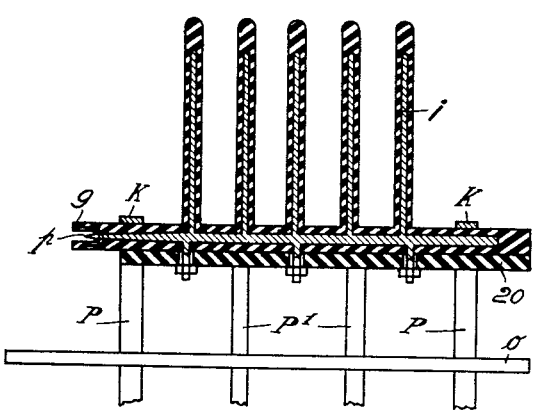
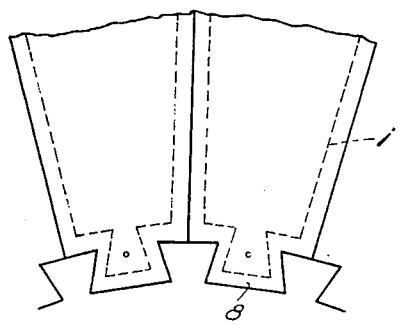
Inventor
Georges Landwerlin
per J. Georges
Attorney

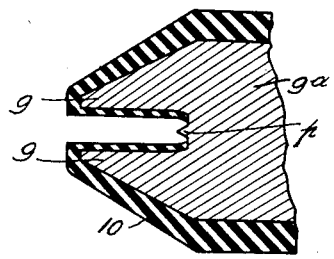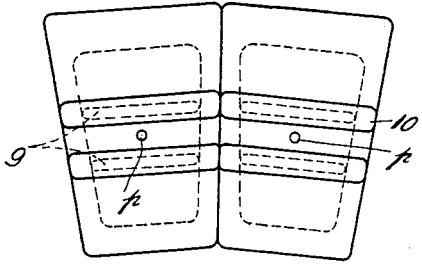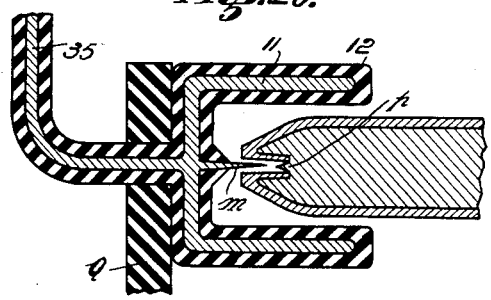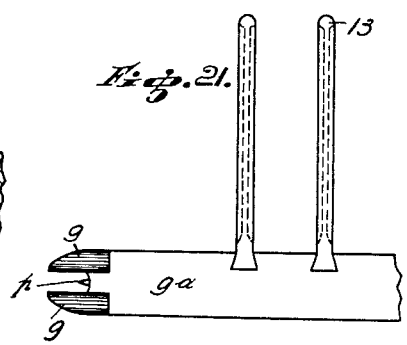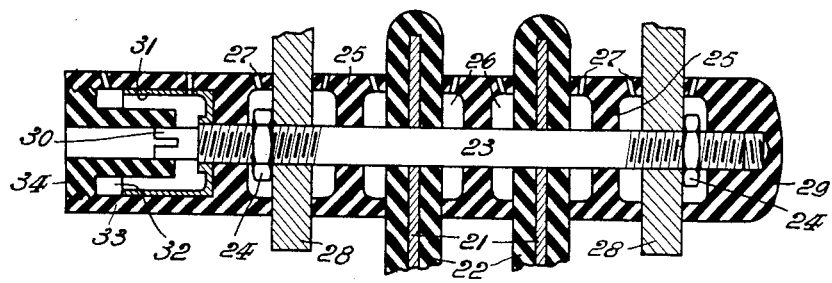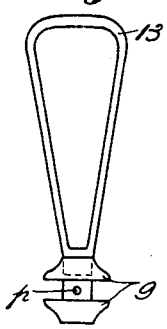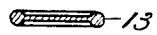

Patented July 30, 1935

2,009,503

UNITED STATES PATENT OFFICE 2,009,503

ELECTROSTATIC MACHINE

Georges Landwerlin, Marly Le Roi, France

Application April 13, 1933, Serial No. 665,972
In France May 6, 1932

8 Claims. (Cl. 171—328)

The present invention has for its object an electrostatic machine capable of supplying direct current of high tension with a high efficiency.

In the known direct current electrostatic machines, the members carrying the induced electricity move from an inductor pole loaded with electricity of a given symbol, to another pole loaded with electricity of an unlike symbol, so that said carrier members are successively supplied, during the induction, with charges of unlike symbols. Owing to the residual charges which always persist and which remain important notwithstanding any preventive measures, an important loss of energy is produced.

According to the present invention, carrier members or groups of such carriers, arranged upon a circumference and constituting an armature movable about an axis of rotation, are made to travel in front of fixed inductor poles arranged around the circumference and which are all of the same symbol, and in front of discharge poles which are also all of the same symbol but unlike to that of the inductors. The inductor and discharge poles of similar formation alternate with each other and the same carriers or groups of carriers of an armature are always induced with electricity of the same symbol, so that the considerable drawback mentioned herebefore is eliminated.

For obtaining a rational arrangement of the whole and utilizing the charges of unlike symbols in the charging of the inductors and of the discharge plates, the machine comprises a second unit comprising armatures, inductors and discharge poles identical to the foregoing, the stator poles however being provided with charges of unlike symbols. The second unit cooperates with the first mentioned and is mounted upon the same rotary shaft. It may be arranged symmetrically to the first unit with respect to the central plane of the machine, with or without angular deviation. Each of the two units may also be arranged on either side of a diametrical plane passing through the axis of rotation of a single armature.

In the known machines, the induction upon the carriers or groups of carriers is suddenly effected when they arrive at a given point within the field of the inductor. Similarly, discharge takes place suddenly through contacts produced in given points. Therefrom results a very bad output and commutation sparks.

The present invention eliminates the aforesaid drawback by the use of fixed contact rails which may be locked during the running of the machine and occupy curves of great length, the carrier elements contacting with said rails for induction and for discharge.

An important improvement consists in the arrangement of the elements of the inductor poles, in which each element is formed by a blade or metallic surface covered with insulating material and by two bare conductive surfaces applied to this insulating material and electrically connected to the blade, the dimensions of said surfaces being smaller than those of the blade; this has for effect to prevent losses through the edges, as the insulated blade constitutes a field screen or guard ring.

A further improvement consists in the method of mounting the armature elements.

According to a further feature of the invention, the points of each armature element which form collector contacts are surrounded by a field screen constituted by a U-shaped metallic element embodied in insulating material, said U-shaped member being electrically connected with the point of the armature element to be protected.

The new machine furthermore presents other features which will be detailed hereafter.

Figure 2:
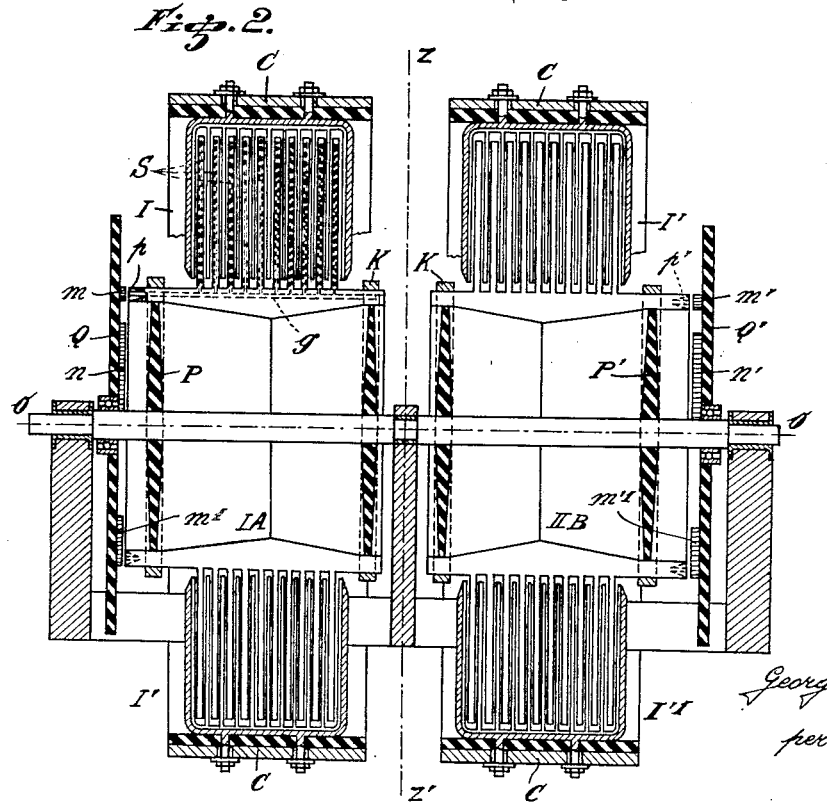

For the purpose of clearness, the accompanying drawings illustrate, by way of example only, one form of embodiment of the machine constructed as two symmetrical units together with modifications of the components. In these drawings:

Fig. 1 is an elevation of a complete machine;
Fig. 2 is a section through the axis of rotation;
Figs. 3 to 10 show details of the machine.
Figs. 11 and 12 are diagrams showing the connections;
Fig. 13 illustrates diagrammatically a modified form of embodiment;
Fig. 14 is a section through one form of inductor element;
Fig. 15 is a partial axial section of the machine showing the arrangement of an armature element;
Figs. 16 and 17 illustrate modified forms of such arrangement;
Figs. 18 and 19 are diagrammatic views on a greater scale showing the protection of the collector contacts;
Fig. 20 is a section showing the protection of the commutation rails;
Figs. 21, 22 and 23 illustrate a modification of the armature element and a method of fixing the blades forming part of the armature element;
Fig. 24 illustrates a form of embodiment of the fixed poles or electrodes.

As illustrated in the drawings, the new machine comprises a rotor and a stator, which are symmetrically arranged with respect to a plane $z\ z'$ at right angles to the axis of rotation $o\ o$, Figs. 1 and 2.

The rotor or armature is constituted by two symmetrical units IA and IIB (Fig. 2). Each unit (Figs. 3 and 4) is constituted with armature elements $i$ (Figs. 3, 4 and 8), which are individually formed by metallic sectors S covered by insulating material $q$ and arranged in parallel rows and close to each other. The edges of the sectors of two consecutive rows intended to be connected are provided with interengaging ribs and grooves (Fig. 4), so that said sectors interengage with each other for mutual consolidation. The sectors of an armature element $i$, spaced by distance elements $e$, Fig. 5, are assembled upon a rod $g$, the end $p$ of which constitutes a collector contact. The whole is buried in insulating material except the contact $p$.

The bottoms of the sectors may also be enlarged as illustrated in Fig. 6, in order to secure higher resistance to lateral flexion and to centrifugal force. In this case, the common base of the sectors replaces the rod $g$ and constitutes the contact $p$. The groups of sectors constituting an armature element may be made as one single cast piece, Fig. 6, and buried in insulating material by moulding.

The armature elements thus constituted are mounted within a frame which may be constituted by insulating discs P, P' (Fig. 2), said elements being held thereon by rings K. The contacts $p$ are arranged upon a circumference and constitute the collector.

The stator comprises the inductor poles I, I', Fig. 1, alternating with the discharge poles D, D', similar to said inductor poles. Said poles are fixed upon an insulating frame C united with the main frame. Each of these poles is formed, Fig. 7, by a row of identical metallic surfaces, between which will pass the armature blades, in the same manner as the movable and fixed blades of a variable air condenser. The inductors have sufficient limbs for simultaneously covering each set of armature elements $i$. The studs V illustrated in Fig. 7 of the drawings are provided for fixing said inductors to the frame of the machine.

In front of the collector contacts $p\ p'$ are arranged fixed insulating plates Q Q' supporting conductor strips for commutation $m\ m'\ m^1\ m'^1$ for the induction, and $n\ n'\ n^1\ n'^1$ for discharge (Figs. 1 and 2 and 11 and 12). The collector contacts rub over these commutation strips.

For better insulation of the strips the one from the other, the plates Q Q' are provided with grooves and corrugations W (Fig. 10) surrounding said strips; the grooves may have an appropriate shape, for instance a combination of circular and radial grooves, as illustrated in Fig. 10.

The induction strips $m\ m'$ start from the neutral line $r\ r'$ preceding the inductors I I' and extend to the central portion of the inductor poles, Figs. 11 and 12.

The discharge strips $n\ n'$ start from a line $t\ t'$, which is that where the armature carriers have the same potential as the discharge poles. The strips end at the central portion of said poles.

The poles are interconnected in a particular manner which may be well understood with reference to the diagram of Fig. 11, which is a plane development of the periphery of the machine.

The pole I is connected to I' by a lead $c$; in a similar manner I' is connected to I'$^1$ by $c'$. The pole D is connected to D$^1$ by $e$; the pole D' is connected to D'$^1$ by $e'$. Moreover, the inductors I and I' are respectively connected to D' and D which feed them, each by a lead $f$ and $f'$, so that the machine is a self-exciting machine.

The strips $m$ and $m'$, $m^1$ and $m'^1$ are also connected with each other by so-called diametral leads $d$ and $d^1$, which may be earthed or not.

$b\ b'$ are the output terminals which are connected to the discharge poles.

The working is as follows:

The carriers S S' submitted to the influence of the inductors I I' and connected to each other by the strips $m$, $m'$ and the so-called diametral leads $d$ are charged with electricity of unlike symbols. The inductor I, for instance negatively charged, induces a positive charge, whereas I', positively charged, induces a negative charge.

This induction is produced as soon as the carriers enter into the field. Therefore, from this moment the strips $m$ and $m'$ put the carriers S S' in contact. The induction is progressively continued until the carriers arrive in the central part of the inductors. At this place the induction is maximum and the carriers S S' leave the strips and are no longer connected.

The charges induced upon the carriers of the armature are greater the more the inducing surfaces enclose the induced elements; they would be equal to the inductor charges if the inductors completely enclosed the carriers which they induce.

As soon as the armature collector contacts leave the strips $m$ and $m'$ and become distanced from the inductors, the potential of the charges induced upon the carriers connected to said contacts, increases according to the known principle.

At the place where the potential of the carriers attains the potential of utilization, which is that of the discharge poles D D', i. e. at the line $t\ t'$, the contacts $p$ enter in contact with the strips $n\ n'$, connected to the discharge poles D D'. Discharge occurs during the whole time that the carriers are in contact with the strips by means of the contacts. It would be total if the poles D D' might completely enclose the carriers.

The same actions are reproduced when the carrier groups in consideration are brought in front of the inductors I$^1$ and I'$^1$, then the discharge poles D$^1$ D'$^1$ and so on, and said actions are simultaneously produced in the different groups of inductors and discharge poles, so that all the actions of the different poles accumulate.

The charges of positive and negative electricity collected by the poles D D' of all the groups, pass to the output terminals $b\ b'$ for utilization at the potential of the discharge poles.

Instead of arranging the connections as shown in Fig. 11, they may be arranged as illustrated in Fig. 12. Here they are similar to the foregoing, but all the inductors of the same symbol are connected with each other and supplied by one single pair of discharge poles which are not connected to the output terminals. The other discharge poles connected with each other according to their symbol supply the output terminals. In this manner a self-exciting machine with independent excitation is obtained.

A modified form of embodiment of the invention consists in providing only a single armature, formed as one of the units IA or IIB described hereinbefore, and arranging the inductors on either side of a diametral plane $y\ y'$ (Fig. 13) passing through the axis of rotation of the armature.

The inductors arranged on the one side $I^1$, $I^2$, $I^3$, Fig. 13, are all charged positively, and those on the other side $I'^1$, $I'^2$, $I'^3$ are all negatively charged. It is understood that discharge poles D alternate with these inductors. In this case, the armatures collect charges always of the same symbol during one half of a revolution and always of unlike symbol during the other half.

In the machine constituted as just described, the fact of always charging the same charge carriers with electricity of the same symbol avoids loss of energy due to residual charges. The mechanical effects due to the charges which may subsist in the carriers after the passage in the discharge poles are such that they are not opposed to the rotation and do not interfere with the output.

In the new machine, the armatures may be completely covered with insulating material $q$ and mainly upon their faces which face the inductors as shown in Fig. 8. On the contrary, the stationary inducing surfaces which face the rotor are not insulated, but the outer portion is covered by insulation $q^1$ as shown in Fig. 8.

This arrangement secures uniformity of the inductor field and avoids inversion of symbols of the electricity delivered by the machine.

In order to increase the adherence of the insulation with the armature surfaces, the latter will be provided with recesses into which will penetrate the insulating material.

The arrangement of the contact strips $m$ $m'$ $n$ $n'$ prevents induction being suddenly produced when the carriers arrive in a given point of the inductor fields, and discharge taking place suddenly, as is the case in the existing machines, with, as a consequence, sparks and bad output.

In the new machine, induction and discharge of the carriers take place progressively, starting from the entrance of the armatures in the corresponding fields, by the contact of the points $p$ of the armature elements, with the fixed strips $m$ and $m'$, $n$ and $n'$, and so on.

All along the strips $m$ and $m'$ the armature elements are progressively charged thus avoiding the passage of a current in the conductor $d$.

Simultaneously, as long as a movable element remains in contact with the strip $n$ or $n'$, it progressively discharges at a constant potential, which is just the potential of output at the terminals $b$ and $b'$.

In order to eliminate any risk of sparks between the contacts $p$, the latter may be surrounded by insulation $u$, in the form of cones as illustrated in Fig. 9. It is advisable to provide upon the surface of this insulation corrugations increasing the track which superficial discharges would have to follow.

In the above description it has been said that the inductor poles should remain uncovered, in order to avoid inversion of the current symbols. In the inductor arrangement illustrated in Fig. 14, each conductive blade $i$ is covered by insulation $l$ upon which are applied, on either side, bare metallic surfaces 2, which are electrically connected to the blade $i$. These surfaces are of less width and of less height than the blade $i$, as illustrated in the drawings, so that their edge 3 is substantially parallel to the edge 4 of the blade $i$ and leaving a margin therewith.

Owing to this arrangement, the bare surfaces 2 constitute the inductors upon the armature blades S. The losses through the edges 3 of these surfaces are considerably reduced by the insulated portion of the blade $i$ which projects beyond the edges 3 and thus constitutes a guard ring reducing the field upon the edges 3.

Other arrangements in the construction of the armature will be described hereafter.

Such arrangements of the armature have for an object to ensure their resistance to centrifugal effects to which they are submitted during the running, by making the central part of an armature element united with the shaft. This arrangement is particularly useful when said armature element presents a certain width parallel to the axis of rotation.

For this purpose, an intermediate ring may be arranged between the rings K placed around a disc P. If this ring is metallic and not covered with insulation, the space of the rotor within which said ring is arranged will not be provided with a fixed blade.

For this purpose also the central portion of the metallic part of the armature element, Fig. 15, may be prolonged by a rod 5 threaded at its end. This rod passes through a band 6 of insulating or insulated material, and is engaged by a nut 6a. This nut is insulated in the band by casting an insulating substance in a lodging of the nut for instance. The rows of armature elements are thus all bolted to the band 6, and mechanically connected with each other but not electrically, this increasing the resistance to centrifugal force.

Said bands may be replaced by a cylinder or drum 20, Fig. 16, made of insulating or insulated material and upon which would also be placed the armature elements. Said cylinder or drum is secured to the shaft $o$ by connecting it by its ends to the lateral discs P. Intermediate discs $P^1$ may also be added, the latter being attached to the shaft $o$.

For obtaining a solid construction of the armature, it may be carried out as follows:

The ends or bases 8 of the armature elements facing the center may be dove-tailed, Fig. 17, and engaged in corresponding recesses in a drum or cylinder united with the shaft $o$, each armature element being electrically insulated from the adjacent one.

Different forms of embodiment of the devices constituting the collector will be described hereafter.

In order to avoid any risk of sparks between the contacts $p$, each is protected at its end by a metallic piece 9, Fig. 16, of U section, surrounding as much as possible the bare ends of the contact $p$. This piece is insulated and electrically connected to the contact $p$.

Figs. 18 and 19 illustrate this arrangement in detail, in section and in elevation, and show clearly a point $p$ and the piece 9 surrounding the same. Said piece 9, here formed in the cross bar or base 9a of the armature element itself, is covered with insulation 10 just like the armature element.

The piece 9 constitutes a field screen upon the bare contact $p$; it considerably reduces the field at the vicinity of the bare contact $p$ and thus avoids disrupture between the consecutive bare contacts $p$ due to the difference of potential between the contacts.

The U-piece may have its limbs extending parallel to the axis of rotation, Figs. 16, 18 and 19; or otherwise it may have its limbs extending axially outwards as illustrated for instance in Fig. 15.

The contact strips $m$ $m'$ $n$ $n'$ which are used for the charge and discharge of the armature elements are supported by plates Q Q' which are fixed, but adjustable during the running, Fig. 20.

Said strips are protected by a field screen 11 constituted by a metallic element of U-section, enclosing the strip $m$ in the best possible manner and being electrically connected therewith and covered by insulation 12.

As the strip $m$ is in electric relation by an insulated connection with the discharge pole which it feeds, the screen 11 prevents the loss of charges of said pole by means of the strip $m$ which is bare in front of the contact $p$.

The strips $m$ may be constituted by a blade having a sharp edge or by a series of points or brushes. They may be also constituted by metallic surfaces; in this case the points $p$ may be carbon brushes.

It has been mentioned herebefore with reference to Fig. 6 that the armature element blades may have a thickness decreasing in the outward radial direction for the purpose of substantially approaching uniformity of resistance to centrifugal force.

In this case the periphery of each blade of the armature element is arranged in the shape of a strand 13, Figs. 21, 22 and 23, having the greatest possible radius in order to avoid edge losses.

The bases of the blades or sectors may be themselves dove-tailed for the purpose of being fixed to the cross bar 9a forming the base of the armature element, Fig. 21. This figure shows a non-insulated armature element constituted with sector blades having a strand-like periphery and fixed upon the base cross bar by dove-tail projections. Here, the beaks 9 of the U-shaped member have been enlarged for a better enclosing of the contact $p$.

Fig. 24 illustrates a form of embodiment of the fixed poles or electrodes (inductor poles or discharge poles).

In this form of embodiment, said poles are constituted by pieces 21. In the case of discharge poles, they are covered with insulation 22. They are connected with each other both mechanically and electrically by metallic rods 23, provided at their ends with nuts 24, which secure the whole together. Intermediate each element are arranged the distance pieces 25, formed by blocks of insulating material provided with recesses 26 in which, after complete mounting, an insulating material may be cast through channels 27. These rods are supported by fixed pieces 28 united with the stator.

At the ends of the rods 23, which must not be provided with electric connections, each of the rods is capped with a cap of insulating material 29, also provided with a recess in which insulating material may be cast.

On the contrary, the ends 30 of the rods 23, which are provided with electric connections, are arranged as illustrated in Fig. 24. They are provided with a metallic protecting screen 31 in electric contact with the rod and lodged in a hole 32 provided in the element 33 surrounding the end of the rod. This hole is closed by an insulating stopper 34, leaving between it and the screen a space in which insulating material may be cast.

The end of the rod is provided with any suitable means for fixing in a removable manner, a lead for supplying current. In the drawings has been illustrated a notch intended to receive a corresponding plug.

This device constituting a terminal with protecting screen, illustrated at the end of the rods 23, is not only applicable to said rods but to any element of the machine which must present a non-insulated end and which nevertheless ought to be protected against losses due to the tension to which said elements are submitted. Particularly, such terminal with protecting screen may replace the connection illustrated in 35, Fig. 20.

The present machine works either as a generator or as a motor.

The foregoing arrangements are only given by way of example; all the details of embodiment, the shapes, dimensions and materials used may vary in any cases without departing from the scope of the invention.

I claim:

1. An electrostatic machine comprising a stator supporting inductor and discharge poles, the discharge poles, all of the same symbol, alternating with inductor poles all of the opposite symbol, a rotor provided with electricity carriers movable with respect to the stator poles, a second stator supporting inductor and discharge poles having the inverse polarity of those of the first mentioned stator, and a second rotor having electricity carriers movable with respect to said second stator.

2. An electrostatic machine comprising a rotor provided with electricity carriers, and a stator having a plurality of discharge poles, all of the same symbol, alternating with a plurality of inductor poles, all of the opposite symbol, arranged on one side of a diametral plane passing through the axis of rotation of the rotor, a second identical group of discharge and inductor poles but having the inverse polarity being arranged at the other side of said diametral plane.

3. In an electrostatic machine of the type set forth, a rotor constructed with a pair of insulating discs mounted at a distance apart upon a shaft, one piece conductive rotor elements having a base and a series of parallel carrier blades, the elements being buried in insulating material except one point of the base which forms a collector contact, and hoops for assembling said rotor elements to said discs, substantially as described.

4. In an electrostatic machine of the type described, a rotor comprising a shaft, a pair of insulating discs mounted at a distance apart upon said shaft, rotor elements fixed intermediate the discs by means of concentric rings, said rotor elements comprising rows of parallel electricity carriers buried in insulating material except one point at the base which forms a collector contact, a fixed insulating disc coaxial with said shaft and conductor strips on said disc facing the contacts for the purpose set forth.

5. A direct current electrostatic machine comprising a frame, a shaft journalled in said frame, as a unit a pair of insulating discs mounted at some distance apart upon said shaft, rotor elements fixed between the discs and comprising rows of parallel electricity carriers buried in insulating material, means for connecting these carriers and an electric contact common to all carriers of each row, inductor pole pieces and discharge pole pieces fixed to the frame but insulated therefrom, both these pole pieces having fixed blades parallel to each other and engaging between adjacent carrier blades of the rotor elements, the blades of the inductor pole pieces being noncovered with insulating material at the sides facing the carriers and the arrangement being such that the discharge pole pieces, all of the same symbol, alternate with inductor pole pieces all of the opposite symbol, fixed conductor strips facing the aforesaid contacts for commutation during the induction and discharge of the rotor elements, each strip for induction corresponding to an inductor pole piece being electrically connected with a symmetrically arranged strip of opposite symbol and each strip for discharge being electrically connected with a discharge pole piece corresponding thereto, the strips extending over an arc such that the contact with a rotor element starts with the entrance of said element within the field of the fixed pole piece considered and that the contact ends when said rotor element arrives within the pole piece considered, means for supporting said strips, and a second unit identical to the aforesaid unit in which the discharge and inductor pole pieces have the inverse polarity of that of said first unit, both units being driven by said shaft.

6. A direct current electrostatic machine comprising a frame, a shaft journalled in said frame, as a unit a pair of insulating discs mounted at some distance apart upon said shaft, rotor elements fixed between the discs and comprising rows of parallel electricity carriers buried in insulating material, means for connecting these carriers and an electric contact common to all carriers of each row, inductor pole pieces and discharge pole pieces fixed to the frame but insulated therefrom, both these pole pieces having fixed blades parallel to each other and engaging between adjacent carrier blades of the rotor elements, the blades of the inductor pole pieces being noncovered with insulating material at the sides facing the carriers and the arrangement being such that the discharge pole pieces, all of the same symbol, alternate with inductor pole pieces, all of the opposite symbol, fixed conductor strips facing the aforesaid contacts for commutation during the induction and discharge of the rotor elements, each strip for induction being electrically connected with a symmetrically arranged strip of opposite symbol and each strip for discharge being electrically connected with a discharge pole piece corresponding thereto, the strips extending over an arc such that the contact with a rotor element starts with the entrance of said element within the field of the fixed pole piece considered and that the contact ends when said rotor element arrives within the pole piece considered, means for supporting said strips, a second unit identical to the aforesaid unit in which the discharge and inductor pole pieces have the inverse polarity of that of said first unit, and electric conductors connecting the inductor pole pieces of the same symbol with each other, electric conductors connecting the discharge pole pieces of the same symbol feeding the output line with each other, electric conductors connecting the discharge pole pieces of the same symbol feeding the inductors with each other, and conductors connecting the discharge pole pieces feeding the inductors to the said inductor pole pieces of the same symbol.

7. In an electrostatic machine of the type set forth, rotor elements comprising each a row of electricity carriers formed by parallel blades, a metallic rod connecting these carriers with interposition of distance pieces, the free end of this rod forming a collector contact, substantially as set forth.

8. In an electrostatic machine of the type set forth, movable rotor elements and fixed inductor and discharge pole pieces comprising rows of parallel conductor blades, said blades having a greater thickness at their bottom portion than at their outer free ends, substantially as set forth.

GEORGES LANDWERLIN.